United States Patent [19]

Croft

[11] Patent Number: 5,708,549
[45] Date of Patent: Jan. 13, 1998

[54] INTEGRATED CIRCUIT HAVING ENHANCED TRANSIENT VOLTAGE PROTECTION AND ASSOCIATED METHODS

[75] Inventor: Gregg D. Croft, Palm Bay, Fla.

[73] Assignee: Harris Corporation, Palm Bay, Fla.

[21] Appl. No.: 726,183

[22] Filed: Oct. 4, 1996

[51] Int. Cl.$^6$ .................................................. H02H 3/22
[52] U.S. Cl. ........................... 361/56; 361/111; 361/89
[58] Field of Search ........................... 361/56.89, 91, 361/111; 257/355–363

[56] References Cited

U.S. PATENT DOCUMENTS

| | | | |
|---|---|---|---|
| 4,567,500 | 1/1986 | Avery . | |
| 4,870,530 | 9/1989 | Hurst et al. | 361/91 |
| 5,400,202 | 3/1995 | Metz et al. | 361/56 |
| 5,515,225 | 5/1996 | Gens et al. | 361/56 |
| 5,526,214 | 6/1996 | Takata et al. | 362/56 |
| 5,535,084 | 7/1996 | Nakayama | 361/56 |
| 5,535,086 | 7/1996 | Mentzer | 361/91 |

OTHER PUBLICATIONS

R. Merrill, E. Issaq, "ESD Design Methodology", EOS/ESD Symposium Proceedings (1993), pp. 233–237.
G. Croft, "ESD Protection Using a Variable Voltage Supply Clamp", ESD/EOS Symposium Proceedings (1994), pp. 135–140.

*Primary Examiner*—Jeffrey A. Gaffin
*Assistant Examiner*—Michael J. Sherry
*Attorney, Agent, or Firm*—Allen, Dyer, Doppelt, Milbrath & Gilchrist, P.A.

[57] ABSTRACT

An integrated circuit includes protected circuit portions for being electrically connected to an electronic circuit via electrical conductors, and a multiple time constant transient clamping circuit for clamping a transient voltage based upon one of first and second time constants. The first time constant is preferably selected when the integrated circuit is electrically connected to the electronic circuit and is preferably relatively short to permit operation and while protecting the IC from a transient voltage, such as an electrostatic discharge (ESD) event. The longer second time constant is preferably selected when the IC is removed or not electrically connected to the electronic circuit. The longer second time constant is preferably sufficiently long to protect the IC from a transient voltage when the IC is not electrically connected to the circuit board. The multiple time constant transient clamping circuit may include a first active voltage clamp and a first clamp controller, and a second active voltage clamp and second clamp controller. A time constant selecting device having a fixed impedance, such as a resistor or conductive trace, for example, may be electrically connected between two electrical conductors. Method aspects of the invention are also disclosed.

41 Claims, 4 Drawing Sheets

INTEGRATED CIRCUIT HAVING ENHANCED TRANSIENT VOLTAGE PROTECTION AND ASSOCIATED METHODS

FIELD OF THE INVENTION

This invention relates to field of electronics, and, more particularly, to an integrated circuit having protection from transient voltages, as may be caused by static electricity discharges.

BACKGROUND OF THE INVENTION

An electrostatic charge may accumulate on the surface of object or person. The process for charging the human body, for example, is known as triboelectrification—which occurs when an insulator and another material become charged by contact and separation, such as sliding. Shoe soles can become charged as the result of contact and separation with another insulating surface, such as carpet. The surface of a person's clothes can become charged by contact and separation with seat coverings, for example. Accordingly, a person or his clothing may accumulate an electrostatic charge. The human body may act as a neutral conductor to transmit these charges, typically on the order of 1×10–6 Coulombs, to other bodies and objects.

An electrostatic discharge (ESD) event occurs when an accumulated electrostatic charge is transmitted by proximity or contact so that the two bodies reach the same electrical potential. An electrostatic discharge, such as from the touch of a person, for example, can damage and cause the failure of many electronic devices or components. For example, metal oxide semiconductor (MOS) devices may be highly susceptible to ESD event damage because of their inherently high input impedances. Some submicron gate oxides in MOS devices can be ruptured by an ESD event resulting in a voltage transient of only 10–20 V.

Generally, ESD event and other transient voltage protection schemes are applied to the input/output (I/O) pins of an IC. One typical method of protecting an IC from ESD events is to connect each and every I/O pin to positive and negative supplies by reverse biased diodes. When an ESD event occurs, the diodes protect the IC from damage by providing low impedance discharge paths around sensitive internal circuitry of the IC. However, when a transient electrostatic discharge occurs, these diodes may appear to the charge as either forward or reverse biased. Unfortunately, reverse biased diodes provide higher voltage discharge paths for an electrostatic discharge than forward biased diodes. In addition, power dissipated in a reverse biased diode due to an ESD event may be more than an order of magnitude greater than the power dissipated in the same diode when forward biased. Another unfortunate factor with reverse biased diodes is that they require larger junction areas than forward biased diodes. Large area protection diodes on I/O pins contribute unwanted parasitic effects, such as larger capacitances and leakage currents which, in turn, degrade performance.

Clamping circuits have also been used in connection with electrostatic discharge paths through diodes. A supply clamp is typically connected across the power supply and limits the maximum differential voltage that can be applied between the pins. The supply clamp acts as voltage limiter by conducting large amounts of current when a predetermined maximum differential voltage or clamp voltage is exceeded. A typical clamp provides a conduction path at a voltage higher than the power supply, but lower than the breakdown voltage of the reverse biased protection diodes. Clamps have also been used to bypass the reverse biased I/O protection diodes, thereby reducing the reverse biased diode junction size requirement by reducing the power dissipation requirement.

While the addition of a clamp provides a greater level of protection, the clamp voltage is still typically set higher than the supply voltage. Many possible transient discharge paths exist through the internal circuitry of the IC, and it is possible that some of these paths will conduct at voltages lower than the clamp voltage. If so, the current from the transient will pass through these paths rather than through the clamp. An article by the present inventor entitled "ESD Protection Using a Variable Voltage Supply Clamp," ESD/ EOS Symposium Proceedings (1994) pp. 135–140 discloses a protection circuit to address this shortcoming.

In particular, the described circuit of the inventor's article provides for two clamp voltages, wherein a first clamp voltage is higher than the maximum supply voltage, and the second clamp voltage is lower than the diode or oxide breakdown voltages on the protected IC. The circuit uses two positive and two negative supply pins so that when the IC is mounted on the printed circuit board, two positive supply pins are shorted together and two negative pins are shorted together, both connections made through traces on the printed circuit board. In other words, the protection scheme relies on the principle that the majority of ESD damage occurs during handling before the IC is mounted on the circuit board. The shortcomings of the approach using two different clamping voltages are that extra pins are required and unwanted latch-up of the circuit may occur if the IC is inserted into a socket which is already powered.

SUMMARY OF THE INVENTION

In view of the foregoing background it is therefore an object of the present invention to provide an integrated circuit and associated method to provide transient voltage protection, such as for an ESD event, for the IC before, during, and after its placement on a circuit board and without adversely affecting the start-up or operating performance of the IC.

These and other objects, features and advantages of the present invention are provided by an integrated circuit comprising protected circuit portions for being electrically connected to an electronic circuit via electrical conductors, and multiple time constant transient clamping means for clamping a transient voltage at the protected circuit portions based upon one of a first time constant and a longer second time constant. In particular, the first time constant is preferably selected when the integrated circuit is electrically connected to the electronic circuit.

The first time constant is preferably relatively or sufficiently short to permit operation of the protected circuit portions and while protecting same from a transient voltage when electrically connected to the circuit board. The longer second time constant is preferably selected when the integrated circuit is removed or not electrically connected to the electronic circuit. The longer second time constant is preferably sufficiently long to protect the protected circuit portions from a transient voltage, such as an ESD event pulse, at the electrical conductors when the integrated circuit is not electrically connected to the circuit board. The IC is typically more susceptible to damage from an ESD event when removed from the circuit board than when connected to the circuit board and other electronic components.

The multiple time constant transient clamping means may be provided by at least one active voltage clamp and associated clamp control means. The clamp control means preferably comprises a resistance-capacitance (RC) network which is readily implemented in the integrated circuit during manufacturing. The capacitance may be in a range of about 0.5 to 5 picofarads, and the resistance in a range of about 1,000 to 100,000 Ohm. These values may be selected so that the first time constant is preferably less than about 20 nanoseconds, and the second time constant is preferably greater than about 100 nanoseconds.

The active voltage clamp may comprise a Darlington pair of transistors, for example. Alternately, the active voltage clamp may be provided by a metal oxide semiconductor (MOS) transistor having its gate driven by a string of inverters. PMOS and NMOS transistors may be used.

Another important aspect of the invention is that the circuit Board may include time constant selecting means, cooperating with the multiple time constant transient clamping means, for selecting the first time constant when the integrated circuit is electrically connected to the circuit board. More particularly, the multiple time constant transient clamping means may include a first active voltage clamp and a first clamp controller being connected between an electrical node and a first electrical conductor, and a second active voltage clamp and a second clamp controller being connected between the electrical node and a second electrical conductor. The electrical node may be internal or connected to a third electrical conductor. The time constant selecting means may be electrically connected between the first and second electrical conductors. The time constant selecting means on the circuit board may be provided by a predetermined impedance, such as by a resistor, a jumper, or a conductive trace, for example.

The integrated circuit may further comprise reverse diode means electrically connected to at least some of the plurality of electrical conductors, such as input/output pins, for further protecting the protected circuit portions of the IC. Also, the IC may further include floating means for permitting a voltage on at least some of the electrical conductors to be outside a supply voltage range.

A method aspect of the present invention is for protecting portions of an integrated circuit of the type including a plurality of electrical conductors for electrically connecting protected circuit portions to an electronic circuit. The method preferably comprises the steps of: clamping a transient voltage at the protected circuit portions based upon a first time constant when the integrated circuit is electrically connected to the electronic circuit to permit operation of the protected circuit portions and while protecting same from a transient voltage; and clamping a transient voltage at the protected circuit portions based upon a second time constant when the integrated circuit is not electrically connected to the electronic circuit to protect the protected circuit portions from a transient voltage.

The steps of clamping preferably comprise: connecting a first active voltage clamp and associated clamp controller between an electrical node and a first electrical conductor; and connecting a second active voltage clamp and associated clamp controller between the electrical node and a second electrical conductor. The method preferably further comprises the step of selecting the first time constant based upon a predetermined impedance electrically connected between the first and second electrical conductors.

DETAILED DESCRIPTION OF THE PREFERRED EMBODIMENTS

Figure 1:
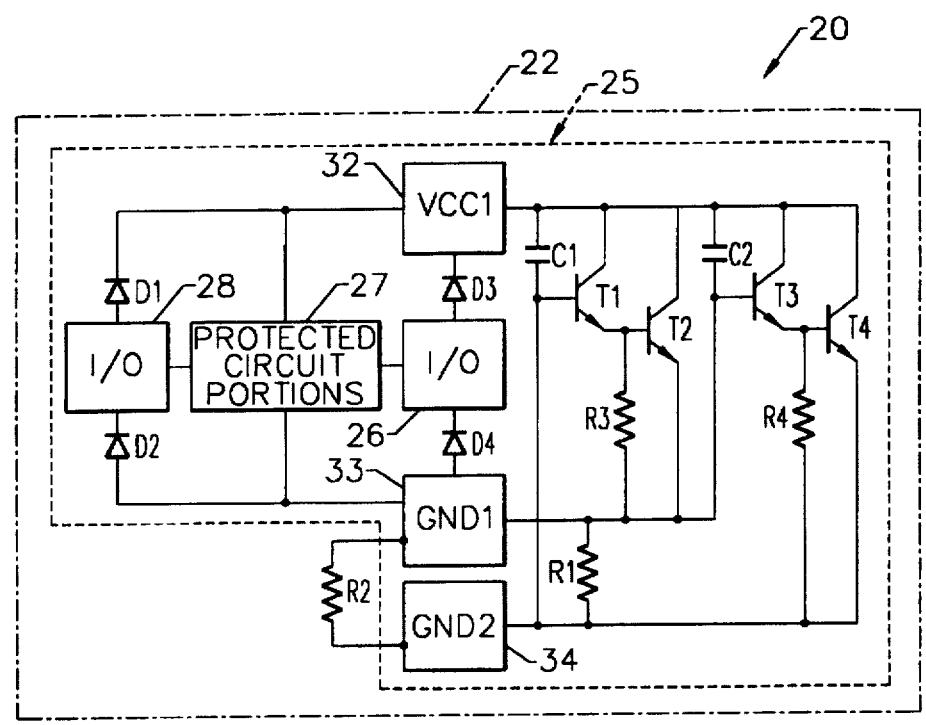
FIG. 1 is a schematic circuit diagram of an integrated circuit having enhanced transient voltage protection according to a first embodiment of the present invention.

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Referring now to FIG. 1, a first embodiment of an electronic circuit 20 including the integrated circuit 25 in accordance with the invention is described. The electronic circuit 20 includes a printed circuit board schematically illustrated by the dot and dash rectangle 22. The integrated circuit 25 includes protected circuit portions 27 for being electrically connected to other components of the electronic circuit 20 via electrical conductors, such as the illustrated input/output (I/O) pins 26, 28 and the illustrated supply pin VCC1 32, and GND1 pin 33 and GND2 pin 34.

The integrated circuit 25 includes multiple time constant transient clamping means for clamping a transient voltage at the protected circuit portions 27 based upon one of a first time constant and a longer second time constant. In particular, the first time constant is preferably selected when the IC 25 is electrically connected to the other portions of the electronic circuit 20. The first time constant is preferably sufficiently short to permit operation of the protected circuit portions 27 and while protecting same from a transient voltage, such as an ESD event as may be caused by human contact, when the integrated circuit 25 is electrically connected to the circuit board 22. The longer second time constant is preferably selected when the IC 25 is removed or not electrically connected to the printed circuit board 22 and other components of the electronic circuit 20. The longer second time constant is preferably sufficiently long to protect the protected circuit portions 27 from a transient voltage, such as an ESD event pulse, at the electrical conductors 26, 28, 32, 33 and 34 when the integrated circuit is not electrically connected to the circuit board 22. As would be readily understood by those skilled in the art, the IC 25 is typically more susceptible to damage from an ESD event when removed from the circuit board 22 than when connected to the circuit board and other electronic components, as the other circuit components provide additional paths to discharge the transient voltage.

As shown in the illustrated embodiment, the electronic circuit 20 includes time constant selecting means, provided at least in part by the illustrated resistor R2, which may be mounted on the circuit board 22. The resistor R2 cooperates with the multiple time constant transient clamping means for selecting the first time constant when the integrated circuit 25 is electrically connected to the circuit board 22.

The multiple time constant transient clamping means is provided in the illustrated embodiment by a first active voltage clamp and first clamp controller connected between the VCC1 conductor or pin 32 and the GND1 conductor or pin 33; and a second active voltage clamp and second clamp controller connected between the VCC1 conductor and the GND2 pin 34. As would be readily understood by those skilled in the art, VCC1 and GND1 represent first and second electrical conductors connected to the supply voltage for powering the integrated circuit.

The time constant selecting means provided by the resistor R2 may be electrically connected between GND1 and GND2 as illustrated when the integrated circuit 25 is mounted to the circuit board 22. The resistor R2 represents one embodiment of a device having a predetermined impedance. Those of skill in the art will recognize that a jumper connection, such as provided by a circuit trace, could also be used to provide a predetermined impedance, that is, a resistance of about 0 Ohms, to select the first time constant. Other devices, whether active or passive, may also be connected between pins or externally exposed conductors of the IC 25 to select the first time constant and are also contemplated by the present invention and as would be readily appreciated by those skilled in the art.

The illustrated embodiment of the integrated circuit 25 includes reverse diode means electrically connected to the plurality of electrical conductors, such as input/output pins 26, 28, for further protecting the protected circuit portions 27. The reverse diode means is provided by the illustrated diodes D1, D2, D3 and D4. Those of skill in the art will recognize that in other embodiments of the reverse diode means, the diodes may be provided by transistor junctions, for example.

The illustrated embodiment of the integrated circuit 25 includes a pair of active voltage clamps and their associated clamp controllers providing the multiple time constant transient clamping means. A first active clamp is provided by the Darlington transistors T1, T2 and the resistor R3, while the second active clamp is provided by the Darlington transistors T3, T4 and resistor R4. The first active clamp is connected between the VCC1 pin 32 and the GND1 pin 33 while the second active clamp is connected between the VCC1 pin 32 and the GND2 pin 34.

Each of the active clamps can be transiently turned on by a pulse having a rapid change in voltage with respect to time (dv/dt), such as from an ESD event caused by human contact, as would be readily understood by those skilled in the art. The charge from the pulse is initially stored in a capacitor C1 or C2. As would be readily understood by those skilled in the art the desired capacitance could be provided by parallel plate or junction capacitors.

With respect to the first active clamp, the capacitor C1 provides base current to the first stage of the Darlington configuration of transistors T1, T2. The length of time that the transistors T1, T2 will continue to conduct after the initial dv/dt triggering is primarily determined by the RC time constant presented to the base of the first transistor T1 by the RC network provided by the capacitor C1 and the resistance connected in series with the capacitor. Operation of the second active clamp provided by T3 and T4 and the associated control capacitor C2 is similar and needs no further description.

The illustrated Darlington configuration of NPN transistors T1, T2 has the collectors of both transistors connected to VCC1. The base of transistor T1 is connected to the capacitor C1. The base of transistor T2 is connected to the emitter of transistor T1 and is tied to GND1 via resistor R3. The emitter of transistor T2 is also connected to GND1 in the illustrated embodiment.

The Darlington transistor configuration desirable for the present invention because it can considerably increase the current switched for a given base drive. The VCE(SAT) for the Darlington configuration is generally more than that of a single transistor of similar rating with a corresponding increase in on-state power loss. During switching, the reverse-biased collector junction may show hot spot breakdown effects that are specified by the reverse-bias safe operating area and forward bias safe operating area. A modern Darlington with highly interdigitated emitter base geometry may have more uniform current distribution and therefore considerably improve the secondary breakdown effects.

Because GND1 and GND2 are separate pins 33, 34 on the IC 25, it is possible to externally alter the RC time constant of the transient clamps by altering the resistance between these two pins. For example, if the IC 25 were freestanding with no direct external connection between GND1 and GND2, the RC time constant of the clamps will be fairly long as determined in part by the resistor R1. This is beneficial from an ESD event protection point of view because it means a transient clamp can initially be triggered by the rapid dv/dt of an ESD pulse and it will continue to conduct for a relatively long period of time providing a shunt path for the undesired current.

When the IC 25 is mounted on the printed circuit board 22 such that both the GND1 and GND2 pins 33, 34 are connected by resistor R2, the RC time constant is reduced by the parallel addition of the external resistor R2 with the internal resistor R1. This produces a shorter time constant which is beneficial from a circuit performance or functional standpoint since the shorter RC time constant will prevent a clamp from conducting with the IC 25 operating in the electronic circuit 20. For example, the longer time constant may be greater than about 100 nanoseconds, while the shorter time constant may be less than about 20 nanoseconds. The capacitance of C1 and C2 may be in a range of about 0.5 to 5 picofarads, and the resistance in a range of about 1,000 to 100,000 Ohms to produce the desired time constants. The variable or multiple time constant aspect of the present invention makes it possible to discharge a long ESD pulses applied across the pins and without causing the supply pins to draw excessive current upon initially powering the integrated circuit 25.

Figure 2:
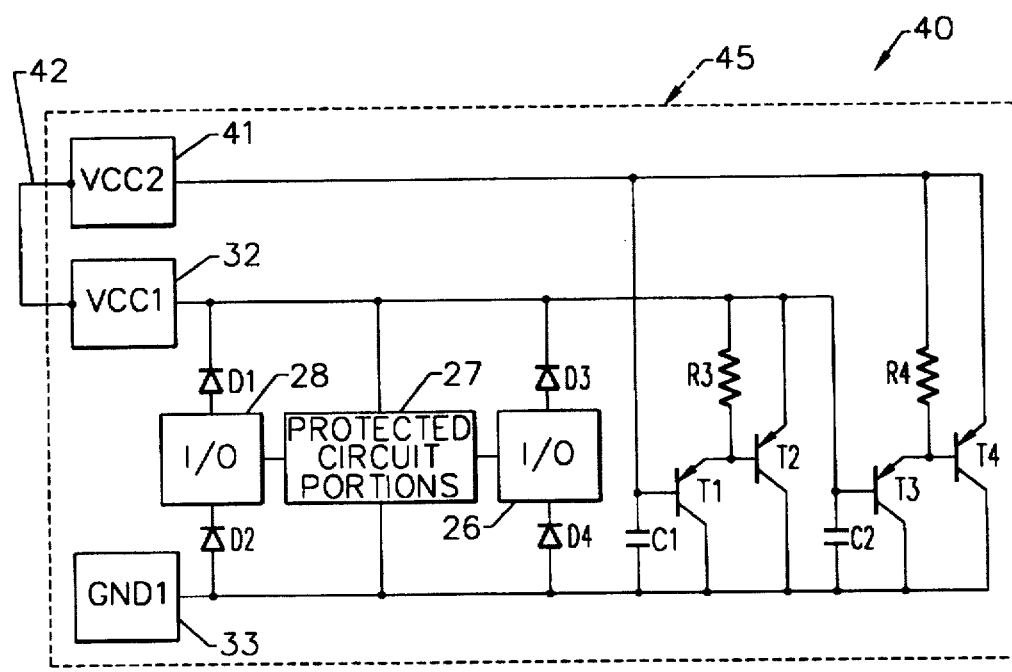
FIG. 2 is a schematic circuit diagram of an integrated circuit having enhanced transient voltage protection according to a second embodiment of the present invention.

Turning now additionally to FIG. 2, a second embodiment of the integrated circuit 45 and electronic circuit 40 according to the invention are illustrated. In this illustrated embodiment, the circuit board is not illustrated for clarity. This embodiment represents a PNP transistor embodiment similar to the embodiment described above with reference to FIG. 1. The embodiment in FIG. 2 differs in that two supply pins are provided, that is, VCC1 pin 32 and VCC2 pin 41, and only one ground pin is provided, that is, GND1 pin 33. Another variation illustrated is that the external resistor R2 in the FIG. 1 embodiment is replaced by an electrically conductive jumper 42 as may be provided by a circuit board trace, for example. The other elements illustrated in FIG. 2 are similar to the correspondingly labelled elements of FIG. 1 described above. Accordingly, those of skill in the art will readily appreciate the operation of the illustrated embodiment of the integrated circuit 45 without further discussion.

Figure 3:
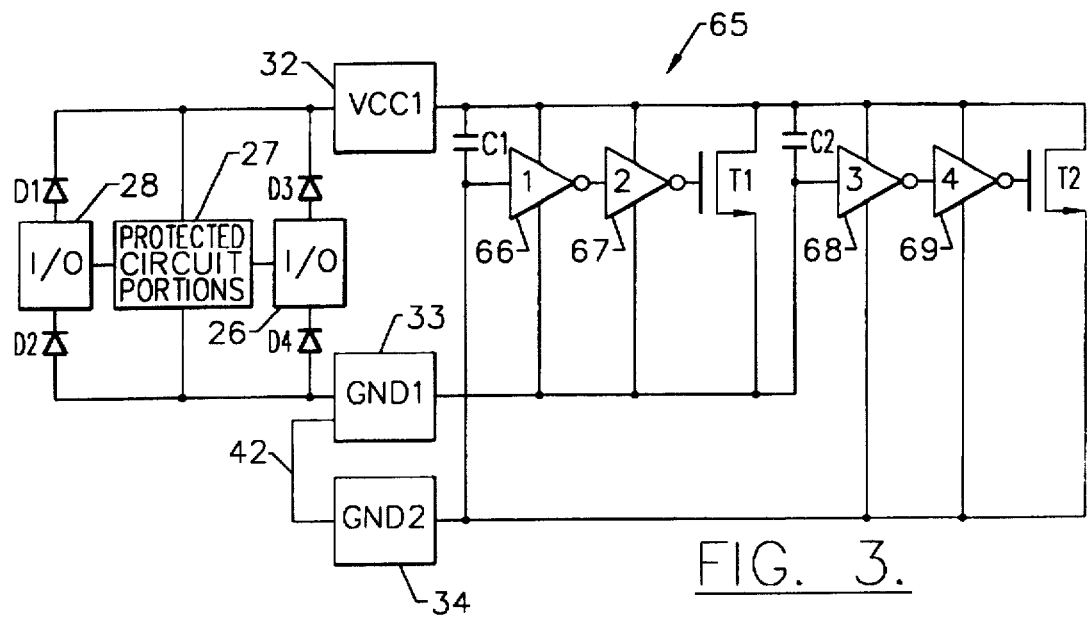
FIG. 3 is a schematic circuit diagram of an integrated circuit having enhanced transient voltage protection according to a third embodiment of the present invention.

Turning now additionally to FIG. 3, an n-channel metal oxide semiconductor (NMOS) implementation of the integrated circuit 65 is illustrated with an external jumper 42 shown connected between GND1 and GND2 pins 33, 34 to select the shorter time constant when the IC is mounted to a circuit board. In the illustrated NMOS implementation, the first clamp is provided by the first and second inverters 66, 67 and the NMOS field effect transistor T1. The output of the first inverter 66 is connected to the input of the second inverter 67. The drain of the MOSFET T1 is electrically connected to VCC1, the source to GND1, and the gate is electrically connected to the output of the second inverter 67 as illustrated. The capacitor C1 operates as described above to provide initial charge storage, while internal resistance of the inverter provides the resistance component of the RC network to thereby prevent clamping when the IC is operating in the electronic circuit and to bleed off the charge after the clamp has been triggered by a transient, as would be readily understood by those skilled in the art. Alternately, a resistor could be connected bridging GND1 and GND2 to provide the resistance component of the RC network. The second clamp and clamp controller are provided by MOSFET T2, third and fourth inverters 68, 69, and the capacitor C2 operate in similar fashion to the first NMOS clamp and controller. The other elements operate as described above and those of skill in the art will readily appreciate the operation of the illustrated embodiment of the integrated circuit 65 without further discussion. Those of skill will recognize that the MOS transistors may be operated without the buffering inverters.

Figure 4:
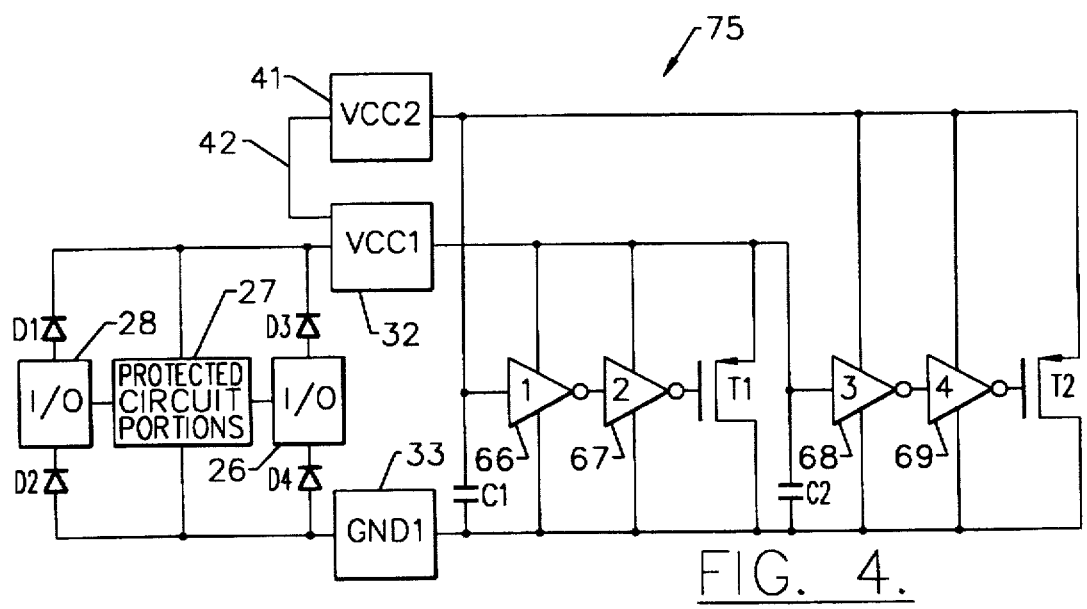
FIG. 4 is a schematic circuit diagram of an integrated circuit having enhanced transient voltage protection according to a fourth embodiment of the present invention.

A p-channel MOS (PMOS) implementation of the integrated circuit 75 is understood with additional reference to FIG. 4. In this embodiment PMOS transistors T1, T2 are used to clamp the transient voltage, and VCC1, VCC2, and GND1 pins 32, 41 and 33, respectively, are used. Those of skill in the art will readily appreciate the operation of the illustrated embodiment of the integrated circuit 75 without further discussion.

Figure 5:
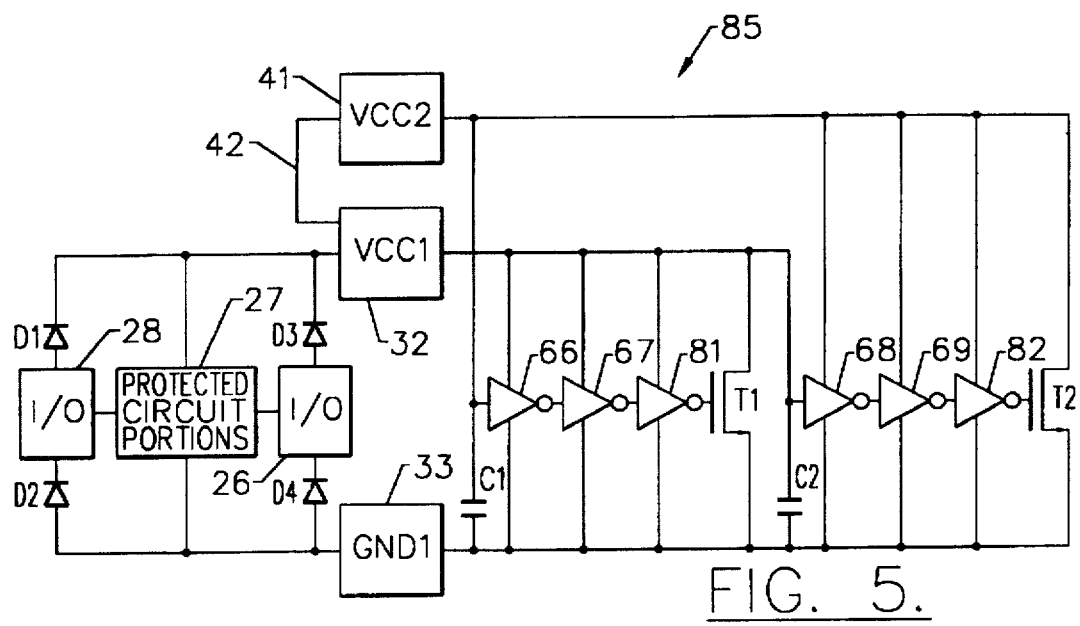
FIG. 5 is a schematic circuit diagram of an integrated circuit having enhanced transient voltage protection according to a fifth embodiment of the present invention.

Another NMOS implementation of the integrated circuit 85 is understood with reference to FIG. 5 wherein three inverters 66, 67 and 81 are used to drive the first NMOS transistor T1, and three inverters 68, 69 and 82 are used to drive the second NMOS transistor T2. The two clamps are connected between the GND1 pin 33 and the two supply VCC1, VCC2 pins 32, 41. The further operation of the illustrated embodiment of the integrated circuit 85 will also be readily appreciated by those of skill in the art without further discussion based upon the above description of similar elements.

Figure 6:
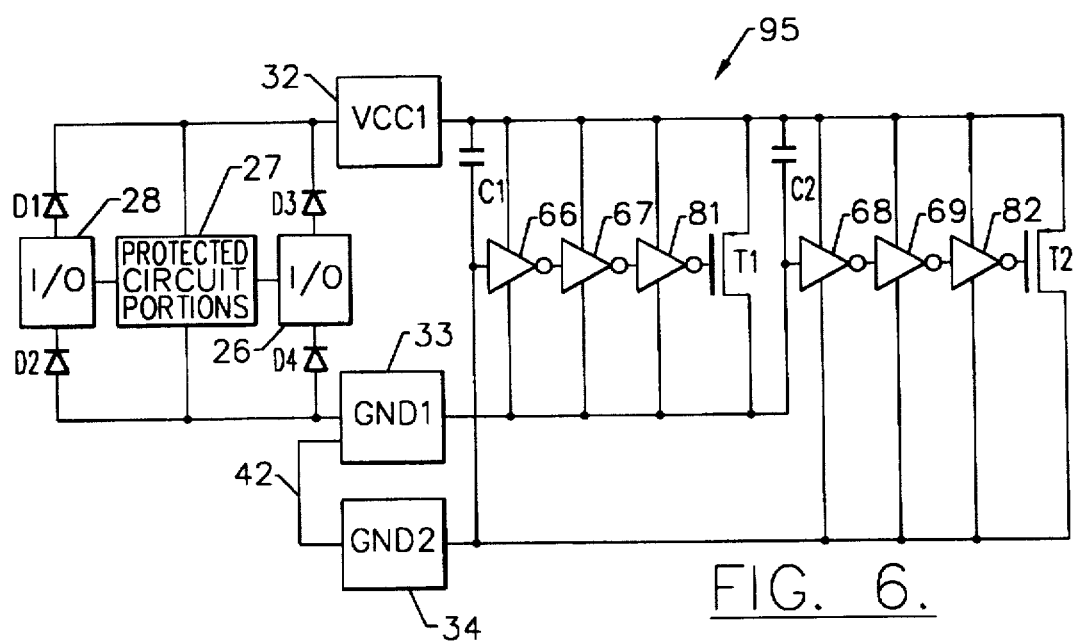
FIG. 6 is a schematic circuit diagram of an integrated circuit having enhanced transient voltage protection according to a sixth embodiment of the present invention.

FIG. 6 illustrates yet another embodiment of the integrated circuit according to the invention wherein PMOS transistors T1, T2 are used with GND1 and GND2 pins 33, 34 and a supply VCC1 pin 32. The operation of the illustrated embodiment of the integrated circuit 95 will be readily appreciated based upon the previous description without further discussion.

Figure 7:
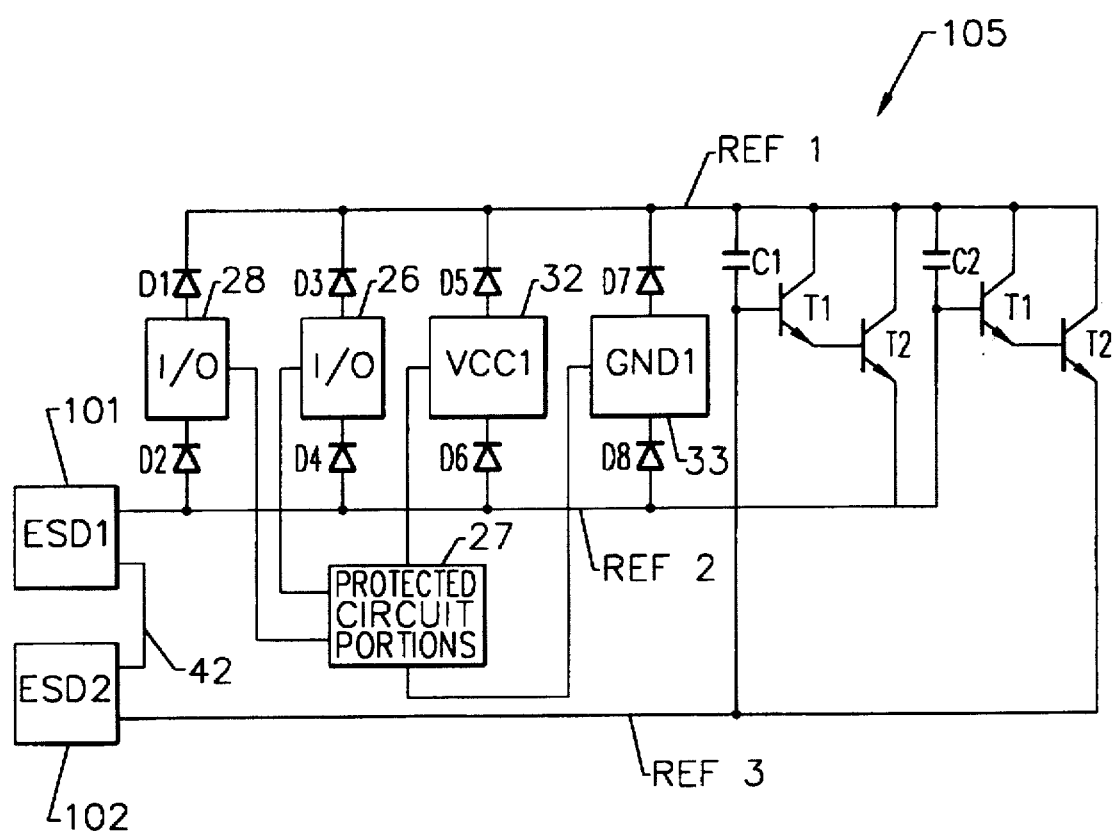
FIG. 7 is a schematic circuit diagram of an integrated circuit having enhanced transient voltage protection according to a seventh embodiment of the present invention.

Yet another aspect of the invention is now described as understood with reference to the embodiment of the integrated circuit 105 shown in FIG. 7. It may be desirable to permit operation of the protected circuit portions 27 with input voltages greater than the voltage range of the power supply. Accordingly, the illustrated integrated circuit 105 includes floating means for permitting a voltage on the input/output (I/O) pins 26, 28 to be outside a supply voltage range. The floating means is provided by the pair of reverse biased diodes D5, D6 connected to the supply VCC1 pin 32, and the pair of reverse biased diodes D7, D8 connected to the GND1 pin 33 as illustrated. Those of skill in the art will appreciate that the diode function may be provided by diodes or transistor junctions, for example.

The floating means defines the illustrated three reference nodes REF1, REF2 and REF3 in the integrated circuit 105. The multiple time constant transient clamping means in this embodiment is provided by a first active clamp and controller connected between the first reference node REF1 and the second reference node REF2, while the second active clamp and controller are connected between the first reference node REF1 and a third reference node REF3. Only the second and third reference nodes are accessible from external to the integrated circuit 105 via the ESD1 pin 101 and the ESD2 pin 102 as illustrated. Connection of the illustrated jumper 42 selects the time constant to the desired value as discussed above. Of course, a resistor or other device having a predetermined impedance could be used in the place of the jumper 42. Accordingly, the multiple time constant transient clamping means may operate to protect the protected circuit portions 27 even if not directly electrically connected to VCC1 and GND1 and while providing the capability for input voltages to exceed the supply voltage. Further operation of the illustrated embodiment of the integrated circuit 105 will be readily appreciated by those of skill in the art without further discussion and based upon the description of the other embodiments.

The following Example is intended to be further illustrative of the invention without limiting thereof.

EXAMPLE

The circuit shown in FIG. 1 was fabricated using a dielectrically isolated polysilicon emitter bipolar process. It was implemented as part of the ESD protection network for an analog IF limiter chip operating in the 40 to 400 Mhz frequency range. For this particular implementation R1 was left open and R2 was shorted. In addition to the protection circuity shown in FIG. 1, diodes were connected in antiparallel across all differential inputs to provide extra protection for the base emitter junctions of the input transistors. This was feasible for these inputs because the maximum expected differential input voltage under normal operation was less than 500 mV. To facilitate a direct performance comparison, several wafers of this IF limiter chip were fabricated using a metal mask option that disconnected the ESD protection on part of each wafer but left it connected elsewhere. This allowed direct comparison of electrical performance and ESD thresholds both with and without the ESD protection network connected.

Performance comparisons were made using assembled units from the same wafer to null out any differences due to normal wafer-to-wafer variability. The electrical performance data for both the ESD protected version and the unprotected version at various frequencies is summarized in Table 1. The electrical performance of the ESD protected version was only slightly reduced. More importantly, however, the human body model (HBM) ESD threshold was significantly enhanced. The HBM ESD data is summarized in Table 2. Unprotected units failed as low as 300 volts while protected units passed at 2000 volts and failed at 2500 volts HBM. In addition to the HBM data, a minimal amount of charge device model (CDM) data was collected. The protected units passed at 1000 volts and the unprotected units failed at 1000 volts when stressed on the CDM tester.

TABLE 1

AC Performance Comparison

| Freq. | Test | Unprotected Units | Protected Units |
|---|---|---|---|
| 40 MHz | Gain | 46.74 dB | 45.68 dB |
| 40 MHz | Noise Fig. | 9.83 FdB | 9.962 FdB |
| 100 MHz | Gain | 47.77 db | 46.52 dB |
| 100 MHz | Noise Fig. | 9.95 FdB | 9.99 FdB |
| 200 MHz | Gain | 49.95 dB | 48.67 dB |
| 200 MHz | Noise Fig. | 9.67 FdB | 10.01 FdB |
| 400 MHz | Gain | 44.22 dB | 43.20 dB |
| 400 MHz | Noise Fig. | 9.33 FdB | 9.40 Fdb |

TABLE 2

Comparison of HBM ESD Threshold Voltage for Protected Vs. Unprotected Units

| HBM ESD Voltage | Unprotected Units | Protected Units |
|---|---|---|
| 300 V | Fail | Pass |
| 500 V | Fail | Pass |
| 1000 V | Fail | Pass |
| 1500 V | Fail | Pass |
| 2000 V | Fail | Pass |
| 2500 V | Fail | Fail |

The clamping technique of the present invention has been found to reduce the capacitance and leakage current of the input and output protection networks. This reduction in I/O capacitance is very useful for IC's that must operate at high frequencies. This approach was used to implement a transient ESD protection network on an analog IF limiter chip. HBM ESD levels increased by greater than four times with only a minor reduction in AC performance even when operating at 400 MHz. The multiple time constant transient clamp used in this protection network had the ability to change its RC time constant depending on whether or not it was mounted on a printed circuit board. This property allowed it to use a very long time constant when it was not mounted to ensure the full discharge of all ESD, pulses and then reduce the time constant once it was mounted to avoid interfering in the normal operation of the IC.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An electronic circuit comprising:
   a circuit board;
   an integrated circuit on said circuit board and comprising
      a plurality of electrical conductors,
      protected circuit portions electrically connected to said circuit board via said electrical conductors, and
      multiple time constant transient clamping means for clamping a transient voltage at said protected circuit portions based upon one of a first time constant and a longer second time constant, the first time constant being relatively short to permit operation of said protected circuit portions and while protecting same from a transient voltage when electrically connected to said circuit board, the second time constant being relatively long to protect said protected circuit portions from a transient voltage at said electrical conductors when said integrated circuit is not electrically connected to said circuit board; and
   time constant selecting means on said circuit board and cooperating with said multiple time constant transient clamping means for selecting the first time constant when said integrated circuit is electrically connected to said circuit board.

2. An electronic circuit according to claim 1 wherein said multiple time constant transient clamping means comprises at least one active voltage clamp and a clamp controller associated therewith.

3. An electronic circuit according to claim 2 wherein said clamp controller comprises a resistance-capacitance (RC) network.

4. An electronic circuit according to claim 3 wherein said RC network has a capacitance in a range of about 0.5 to 5 picofarads.

5. An electronic circuit according to claim 3 wherein said RC network has a resistance in a range of about 1,000 to 100,000 Ohms.

6. An electronic circuit according to claim 2 wherein said active voltage clamp comprises a Darlington pair of transistors.

7. An electronic circuit according to claim 2 wherein said active voltage clamp comprises a metal oxide semiconductor (MOS) transistor.

8. An electronic circuit according to claim 7 wherein said MOS transistor comprises a PMOS transistor.

9. An electronic circuit according to claim 7 wherein said MOS transistor comprises an NMOS transistor.

10. An electronic circuit according to claim 1 wherein the first time constant is less than about 20 nanoseconds, and the second time constant is greater than about 100 nanoseconds.

11. An electronic circuit according to claim 1 wherein said multiple time constant transient clamping means comprises:
   a first active voltage clamp and a first clamp controller associated therewith being connected between an electrical node and a first electrical conductor; and
   a second active voltage clamp and a second clamp controller associated therewith being connected between the electrical node and a second electrical conductor.

12. An electronic circuit according to claim 11 wherein said electrical node is connected to a third electrical conductor; and wherein said circuit board comprises power supply means electrically connected to said second and third electrical conductors for powering said integrated circuit.

13. An electronic circuit according to claim 11 wherein said time constant selecting means is electrically connected between said first and second electrical conductors.

14. An electronic circuit according to claim 1 wherein said time constant selecting means comprises a predetermined impedance.

15. An electronic circuit according to claim 1 wherein said integrated circuit further comprises reverse diode means electrically connected to at least some of said plurality of electrical conductors for further protecting said protected circuit portions.

16. An electronic circuit according to claim 1 wherein said integrated circuit further comprises floating means for permitting a voltage on at least some of said electrical conductors to be outside a supply voltage range.

17. An integrated circuit for electrically connecting to an electronic circuit, the integrated circuit comprising:

a plurality of electrical conductors;

protected circuit portions for being electrically connected to the electronic circuit via said electrical conductors; and multiple time constant transient clamping means for clamping a transient voltage at said protected circuit portions based upon one of a first time constant and a longer second time constant, the first time constant being selected when the integrated circuit is electrically connected to the electronic circuit to permit operation of said protected circuit portions and while protecting same from a transient voltage, the longer second time constant being selected when the integrated circuit is not electrically connected to the electronic circuit to protect said protected circuit portions from a transient voltage.

18. An integrated circuit according to claim 17 wherein said multiple time constant transient clamping means comprises at least one active voltage clamp and a clamp controller associated therewith.

19. An integrated circuit according to claim 18 wherein said clamp controller comprises a resistance-capacitance (RC) network.

20. An integrated circuit according to claim 19 wherein said RC network has a capacitance in a range of about 0.5 to 5 picofarads.

21. An integrated circuit according to claim 19 wherein said RC network has a resistance in a range of about 1,000 to 100,000 Ohms.

22. An integrated circuit according to claim 18 wherein said active voltage clamp comprises a Darlington pair of transistors.

23. An integrated circuit according to claim 18 wherein said active voltage clamp comprises a metal oxide semiconductor (MOS) transistor.

24. An integrated circuit according to claim 17 wherein the first time constant is less than about 20 nanoseconds, and the second time constant is greater than about 100 nanoseconds.

25. An integrated circuit according to claim 17 wherein said multiple time constant transient clamping means comprises:

a first active voltage clamp and a first clamp controller associated therewith being connected between an electrical node and a first electrical conductor; and a second active voltage clamp and a second clamp controller associated therewith being connected between the electrical node and a second electrical conductor.

26. An integrated circuit according to claim 25 wherein said electrical node is connected to a third electrical conductor; and wherein said second and third electrical conductors are for being connected to a power supply of the electronic circuit; and wherein the time constant is selected based upon a predetermined impedance electrically connected between the first and second electrical conductors.

27. An integrated circuit according to claim 17 further comprising reverse diode means electrically connected to at least some of said plurality of electrical conductors for further protecting said protected circuit portions.

28. An integrated circuit according to claim 17 further comprising floating means for permitting a voltage on at least some of said electrical conductors to be outside a supply voltage range.

29. An integrated circuit for electrically connecting to an electronic circuit, the integrated circuit comprising:

a plurality of electrical conductors;

protected circuit portions for being electrically connected to the electronic circuit via said electrical conductors; and multiple time constant transient clamping means for clamping a transient voltage at said protected circuit portions based upon one of a first time constant and a longer second time constant, said multiple time constant transient clamping means comprising a first active voltage clamp and a first clamp controller associated therewith being connected between an electrical node and a first electrical conductor, and a second active voltage clamp and a second clamp controller associated therewith being connected between the electrical node and a second electrical conductor;

said first and second clamp controllers each being operable based upon the first time constant responsive to a predetermined impedance electrically connected between said first and second electrical conductors when said integrated circuit is electrically connected to the electronic circuit, said first and second clamp controllers each being operable based upon the second time constant responsive to the integrated circuit not being electrically connected to the electronic circuit.

30. An integrated circuit according to claim 29 wherein each of said first and second clamp controllers comprises a resistance-capacitance (RC) network.

31. An integrated circuit according to claim 29 wherein each of said first and second active voltage clamps comprises a Darlington pair of transistors.

32. An integrated circuit according to claim 29 wherein each of said active voltage clamps comprises a metal oxide semiconductor (MOS) transistor.

33. An integrated circuit according to claim 29 wherein the first time constant is less than about 20 nanoseconds, and the second time constant is greater than about 100 nanoseconds.

34. An integrated circuit according to claim 29 further comprising reverse diode means electrically connected to at least some of said plurality of electrical conductors for further protecting said protected circuit portions.

35. An integrated circuit according to claim 29 further comprising floating means for permitting a voltage on at least some of said electrical conductors to be outside a supply voltage range.

36. A method for protecting circuit portions of an integrated circuit, the integrated circuit comprising a plurality of electrical conductors for electrically connecting the protected circuit portions to an electronic circuit, the method comprising the steps of:

clamping a transient voltage at the protected circuit portions based upon a first time constant when the integrated circuit is electrically connected to the electronic circuit to permit operation of the protected circuit portions and while protecting same from a transient voltage; and clamping a transient voltage at the protected circuit portions based upon a second time constant when the integrated circuit is not electrically connected to the electronic circuit to protect the protected circuit portions from a transient voltage.

37. A method according to claim 36 wherein the steps of clamping comprise:

connecting a first active voltage clamp and associated clamp controller between an electrical node and a first electrical conductor; and connecting a second active voltage clamp and associated clamp controller between the electrical node and a second electrical conductor.

38. A method according to claim 37 further comprising the step of selecting the first time constant based upon a predetermined impedance electrically connected between the first and second electrical conductors.

39. A method according to claim 36 wherein the step of clamping based upon the first time constant comprises clamping a transient voltage based upon a time constant of less than about 20 nanoseconds.

40. A method according to claim 36 wherein the step of clamping based upon the second time constant comprises clamping a transient voltage based upon a time constant of greater than about 100 nanoseconds.

41. A method according to claim 36 further comprising the step of permitting a voltage on at least some of the electrical conductors to be outside a supply voltage range.

* * * * *